(12) United States Patent
Marchal et al.

(10) Patent No.: US 12,728,905 B2
(45) Date of Patent: Sep. 8, 2026

(54) HOSPITAL GAS CYLINDER TROLLEY WITH SEMIRIGID SECURING STRAPS

(71) Applicant: INOSYSTEMS, Antony (FR)

(72) Inventors: Frederic Marchal, Antony (FR); Nicolas Tirilly, Antony (FR); Mary Schmitt, Antony (FR); Yann Blandin, Antony (FR)

(73) Assignee: INOSYSTEMS, Antony (FR)

( * ) Notice: Subject to any disclaimer, the term of this patent is extended or adjusted under 35 U.S.C. 154(b) by 317 days.

(21) Appl. No.: 18/636,333

(22) Filed: Apr. 16, 2024

(65) Prior Publication Data

US 2024/0375698 A1 Nov. 14, 2024

(30) Foreign Application Priority Data

May 12, 2023 (FR) ...................................... 2304751

(51) Int. Cl.
*B62B 3/10* (2006.01)

(52) U.S. Cl.
CPC .................................. *B62B 3/104* (2013.01)

(58) Field of Classification Search
CPC .. B62B 3/104; B62B 3/00; B62B 3/10; B62B 2202/022; B62B 2202/02; B62B 2203/44; B62B 2203/00; F17C 13/085; F17C 13/08; F17C 13/084
See application file for complete search history.

(56) References Cited

U.S. PATENT DOCUMENTS 4,116,374 A * 9/1978 Garello ................ F17C 13/084 215/396
4,187,950 A * 2/1980 Peet ..................... F17C 13/085 280/79.5
5,346,165 A * 9/1994 Frean ................... F17C 13/084 248/505
6,168,130 B1 1/2001 Yokogi
(Continued)

FOREIGN PATENT DOCUMENTS

EP 4159585 A1 4/2023

OTHER PUBLICATIONS

Search Report in French Patent Application No. 2304751 dated Dec. 18, 2023.

(Continued)

*Primary Examiner* — James M Dolak
(74) *Attorney, Agent, or Firm* — Quantum Patent Law Firm; Seongyoune Kang

(57) ABSTRACT

The invention relates to a mobile trolley (1) comprising a baseplate (2), several castors (3), a support structure (4) projecting upwards from the baseplate (2), and at least one securing device (30) arranged on the support structure (4) for securing one or more gas cylinders (50) to the support structure (4). Each securing device (30) comprises a first strap element (31) comprising a free first end (31.1), and a second strap element (32) comprising a connecting device (20), these elements becoming secured to one another when the free first end (31.1) of the first strap element (31) is collaborating with the connecting device (20) of the second strap element (32). The strap elements (31, 32) are made of semirigid polymer. Use of such a trolley (1) for transporting one or more gas cylinders containing an NO/N2 mixture and/or oxygen.

15 Claims, 5 Drawing Sheets

(56) References Cited

U.S. PATENT DOCUMENTS

| | | | | |
|---|---|---|---|---|
| 7,789,611 | B2 * | 9/2010 | Wilson | B62B 3/04<br>280/47.15 |
| 7,824,144 | B2 * | 11/2010 | Wilson | B62B 5/0003<br>280/47.15 |
| 8,087,679 | B1 * | 1/2012 | Salvucci, Jr. | B62B 3/04<br>280/654 |
| 9,434,399 | B2 * | 9/2016 | Hsieh | B62B 1/12 |
| 10,053,124 | B2 * | 8/2018 | Intravatola | F17C 13/084 |
| 10,661,045 | B2 * | 5/2020 | Bathe | A61M 16/20 |
| 10,960,241 | B2 * | 3/2021 | Emonin | A44B 11/005 |
| 11,052,810 | B2 * | 7/2021 | Marcusen | B60P 3/055 |
| 12,012,140 | B2 * | 6/2024 | Marchal | B62B 5/06 |
| 2005/0023781 | A1 | 2/2005 | Ortega | |
| 2013/0106073 | A1 * | 5/2013 | Gamard | B62B 3/104<br>280/79.2 |
| 2023/0099470 | A1 | 3/2023 | Marchal et al. | |

OTHER PUBLICATIONS

Search report from corresponding application FR2304751 dated Dec. 18, 2023.

* cited by examiner

HOSPITAL GAS CYLINDER TROLLEY WITH SEMIRIGID SECURING STRAPS

CROSS-REFERENCE TO RELATED APPLICATIONS

This patent application claims priority to French Application No. 2304751, filed May 12, 2023 and the entire contents of which are incorporated herein by reference.

TECHNICAL FIELD

The invention relates to a hospital trolley for simultaneously transporting one or more pressurized-gas cylinder(s) and a gas-delivery apparatus for delivering gas, notably medical NO, so as to be able to deliver the gas to a patient who has need of it, particularly in a hospital environment, notably in intensive care units. The trolley according to the invention comprises improved securing straps making it easier to secure the pressurized-gas cylinder(s) to the trolley to prevent them from toppling and falling on the floor.

BACKGROUND

Nitrogen monoxide or NO is a gaseous medicinal product used to treat patients for various medical conditions such as persistent pulmonary hypertension of the newborn (PPHN), acute respiratory distress syndrome (ARDS), which is observed mainly in adults, or pulmonary hypertension in heart surgery, as disclosed in particular by EP-A-560928, EP-A-1516639 or U.S. Pat. No. 10,201,564.

The gaseous NO usually comes in a pressurized-gas cylinder, in a form in which it is diluted in nitrogen (N2), namely in the form of an NO/N2 mixture. Conventionally, the volume concentration of NO in an NO/N2 mixture packaged in a pressurized-gas cylinder is comprised between 100 and 10 000 ppmv, generally between 200 and 1000 ppmv, for example 800 ppmv (ppmv=ppm by volume).

In order to administer it to a patient, the gaseous NO, i.e. the gaseous NO/N2 mixture, taken from one or more gas cylinders, is supplied to an NO delivery apparatus which is itself connected to the inspiration branch of a patient circuit fluidically connected, on the one hand, to a mechanical ventilator that supplies air or an N2/O2 mixture and, on the other hand, to a respiratory interface (e.g. intubation tube, breathing mask, etc.) that delivers the final gaseous mixture containing the NO at the desired dosage, which final mixture has been obtained by mixing the stream of NO with the stream of air or of N2/O2 mixture, as described in U.S. Pat. No. 5,558,083.

In a hospital environment, gas cylinders, equipment or medical apparatuses are conventionally moved around or transported by means of a trolley. Examples of different hospital trolleys are given in EP2574361, EP1977712, EP3854368, EP3854660, US2009/0302178, FR2926728 and FR2910362.

US2016/0310693 is also known and discloses a trolley comprising a baseplate mounted on castors and equipped with storage spaces to accommodate cylinders of gas, notably of NO. The gas cylinders are held in place by securing straps. Specifically, it is common practice to secure the cylinders by attaching them firmly to the support structure of the trolley to prevent them from potentially falling.

To do this, use is currently made of straps made from flexible fabric which are equipped with buckle fasteners, as illustrated in FIG. 2. Now, in practice, this type of flexible strap presents a number of problems, particularly that they are difficult to fit, particularly as they have a tendency to become wedged behind the gas cylinders thus leading to caregivers losing time in fitting them and, what is more, they are difficult to clean and to disinfect.

Another source, EP4159585, is known and describes a hospital trolley used for transporting several gas cylinders which are held in place by securing straps. However, the straps proposed are not ideal because their fastening mechanisms, which are analogous to those with which flexible fabric strap are equipped, do not allow the straps to be tightened effectively around the cylinders, such that one of these cylinders may topple and then accidentally fall, thus presenting a risk to the caregiving staff.

In other words, the problem is that of proposing a medical trolley that is improved, notably in terms of safety, and able to solve all or some of the above-mentioned problems.

SUMMARY

According to the invention, what is proposed is a mobile trolley, i.e. a unit for transporting gas cylinders and possibly other equipment or apparatus, which is designed to roll along the ground during its movements, and comprising:

- a baseplate configured to accommodate, i.e. accept, at least one gas cylinder,
- several castors for moving the trolley along the ground,
- a support structure projecting upwards from the baseplate, and
- at least one securing device (i.e. an attaching device) arranged on the support structure for securing (i.e. attaching) said at least one gas cylinder to said support structure, wherein said at least one securing device comprises a first strap element comprising a free first end, and a second strap element comprising a connecting device, said first strap element collaborating with the second strap element to allow these to be secured to one another when the free first end of the first strap element is collaborating with the connecting device of the second strap element.

In addition, according to the invention, the first strap element and the second strap element are made of (a) semirigid polymer. Using strap elements made from a semirigid polymer is advantageous and addresses the above-mentioned problem. Specifically, the straps are easier for the user to manipulate because the straps remain in position, unlike fabric straps which drop down under the effect of gravity. In addition, the straps are simpler to clean because straps made of polymer do not have the porosities exhibited by flexible straps made of fabric and therefore do not accumulate dirt as rapidly and/or can be cleaned more easily.

Moreover, the connecting device of the second strap element comprises:

- a main body through which there passes an internal passage that extends between an entrance and an exit and is configured to accommodate at least part of the first strap element,
- immobilizing means able to move between at least two positions, comprising:
- an immobilizing position in which the immobilizing means collaborate with a relief textured region of the first strap element inserted into the internal passage, so as to prevent or oppose, which is to say deny, (at least) any movement of withdrawal (i.e. partial or complete withdrawal) of said first strap element from the internal passage,
- and a releasing position in which the immobilizing means allow (i.e. authorize or no longer oppose) a movement of withdrawal (i.e. partial or complete withdrawal) of the first strap element in said internal passage, and release means, that can be actuated by the user, collaborating with the immobilizing means in order to cause them to pass from the immobilizing position to the releasing position, when actuated by the user.

In addition, the connecting device of the second strap element further comprises tightening means, that can be actuated by the user, configured to collaborate with the relief textured region of the first strap element, when the first strap element is inserted in the internal passage of the connecting device of the second strap element and when also the immobilizing means are in the immobilizing position, so that, when they are actuated by the user, they cause the first strap element to progress translationally within the internal passage of the connecting device, in the direction of insertion, this being for the purpose of increasing or improving the effectiveness of the clamping.

Depending on the embodiment under consideration, the trolley according to the invention may comprise one or more of the following features:

the first strap element and second strap element are made of a polymer material selected from polyurethane or polyamide, such as Nylon®.

the first strap element and the second strap element are configured to be secured to one another, which is to say attached or connected to one another.

the immobilizing means are able to move between at least two positions comprising the immobilizing or locking position and the releasing or unlocking position, and possibly one or more intermediate position(s).

the first strap element is configured to be inserted (i.e. introduced), via its free first end, into (i.e. inside) the internal passage of the connecting device of the second strap element, via the entrance to said internal passage of the connecting device, so as to allow the first strap element to be immobilized (i.e. held fast) within said internal passage of the connecting device of the second strap element.

the first strap element may be (at least partially) inserted by the user into the internal passage of the connecting device of the second strap element via a translational movement, namely a translational movement of insertion, so as to secure the first and second strap elements to one another and thus secure (i.e. attach) the gas cylinder to the trolley.

conversely, the first strap element may be (at least partially) withdrawn, i.e. extracted, by the user from the internal passage of the connecting device of the second strap element via a movement of withdrawal or retraction, likewise translational, which is the opposite of the movement of insertion, namely a translational movement of withdrawal.

the movement of withdrawal of the first strap element from the internal passage or of insertion of the first strap element into the internal passage is a translational movement.

in the immobilizing position, the immobilizing means press against the relief textured region.

the relief textured region comprises a succession of juxtaposed ribs, particularly ribs arranged parallel to one another.

according to one embodiment, the ribs are straight (i.e. linear).

the relief textured region is borne by an external face of the first strap element.

the relief textured region extends over the external face from the free first end, namely the outwardly facing side or surface of the first strap element which is not the side or surface in contact with the body of a gas cylinder.

the relief textured region comprises a succession of ribs forming raised serrations or the like.

the ribs are juxtaposed with one another.

the ribs are configured to allow the first strap element to be inserted (translationally) into the internal passage of the body of the connecting device but prevent it from being withdrawn from said internal passage when the immobilizing means are in the immobilizing position and collaborating with the ribs.

the ribs form a relief made up of "peaks" and "valleys".

the ribs have triangular or similar cross sections.

the ribs each have a front side forming a ramp, and a rear side that is (substantially) vertical, these sides being separated by a crest.

the ramp-forming front side makes, with the (substantially) vertical rear side, an angle comprised between 30 and 60°, preferably of the order of 40 to 50°.

two successive ribs are separated by a valley.

the first strap element further comprises an internal face which is the opposite face to the external face.

the internal face of the first strap element presses against the cylinder held in place by said first strap element, which is to say that the internal face of the first strap element is in contact with the body of the gas cylinder that is to be held in place.

the internal face of the first strap element is smooth, which is to say untextured.

the relief textured region extends over at least 30%, preferably at least 40%, preferably at least 50%, preferably at least 75%, or even at least 80% of the surface area or surface of the external face of the first strap element.

the first strap element and the second strap element each have an elongate shape, preferably the shape of a strip, band or the like.

the first strap element comprises a second end secured to the support structure, typically secured to the front post or to the rear post, for example by screw-fastening.

the second strap element comprises an upstream end secured to the support structure, typically secured to the front post or to the rear post, for example by screw-fastening.

according to another embodiment, the first strap element and the second strap element are secured to one another via the second end of the first strap element and the upstream end of the second strap element which can be connected to one another.

according to yet another embodiment, the first strap element and the second strap element are formed from a single polymer strip.

it comprises several securing devices, preferably pairs of securing devices.

the pairs of securing devices are secured to the support structure, typically secured to the front post and/or to the rear post, for example by screw-fastening.

each gas cylinder is secured using a pair of securing devices.

it comprises at least one gas cylinder containing an NO/N2 mixture and/or an oxygen cylinder, this or the cylinder(s) being positioned on the baseplate.

- according to one embodiment, it comprises two gas cylinders containing an NO/N2 mixture and an oxygen cylinder, these cylinders being positioned on the baseplate.
- in the immobilizing position, the immobilizing means prevent any movement of withdrawal of the first strap element from said internal passage.
- in the releasing position, the immobilizing means do not collaborate or no longer collaborate with the first strap element, so as to allow the withdrawal of the first strap element.
- the internal passage in the body of the connecting device is configured and dimensioned to accommodate (i.e. accept) at least part of the first strap element when said first strap element is inserted into it by the user, via the entrance and towards the exit of said internal passage.
- the release means, that can be actuated by the user, collaborate with the immobilizing means in order to cause them to pass from the releasing position to the immobilizing position, when not actuated by the user, i.e. when released.
- the immobilizing position corresponds to a “default” or “resting” position.
- the release means and the immobilizing means are able to move relative to one another, for example able to pivot relative to one another.
- the release means can be actuated by the user by finger pressure, for example by pressing them with their index finger.
- the release means comprise a push-button or the like, typically a push-button that the user presses in order to actuate it.
- when actuated by the user, the release means act mechanically, either directly or indirectly, on the immobilizing means in order to cause them to pass from the immobilizing position to the releasing position.
- the immobilizing means are normally returned to the immobilizing position in the absence of any actuation of the release means by the user.
- the immobilizing means are normally returned to the immobilizing position by a return device or means, preferably an elastic return means, for example a spring-loaded means or device or the like.
- in the releasing position, the immobilizing means no longer interact with the first strap element, particularly with said relief textured region, particularly so as to allow the first strap element to be withdrawn from the internal passage of the body of the connecting device.
- the immobilizing means comprise a projecting part, such as a cam or the like, that comes into collaboration with the relief textured region, typically with the straight ribs, so as to oppose, i.e. block or prevent, the withdrawal of the first strap element from the internal passage of the body of the connecting device when said immobilizing means, typically said projecting part, come(s) into collaboration with the relief textured region in the immobilizing position.
- the tightening means comprise a lever element that can be actuated by the user.
- the lever element is able to pivot, i.e. rock, preferably about an axis YY.
- the lever element comprises a distal portion that comes into collaboration with the textured region of the first strap element when the first strap element is accommodated in the internal passage of the connecting device of the second strap element.
- the distal portion of the lever element comes to press (e.g. into abutment) on the textured region of the first strap element, particularly on one of the faces of a rib, typically the vertical rear face thereof.
- the proximal portion of the lever element can be actuated by the user who, in particular, can actuate it and/or grasp it in order to cause the lever element to pivot or to rock.
- the proximal portion and the distal portion of the lever element are connected by a junction portion.
- the proximal portion is in the form of a loop.
- the tightening means can be moved at least between a resting position in which they do not interact with the textured region of the first strap element, and an actuated position in which they interact, i.e. collaborate, with the textured region of the first strap element.
- the tightening means are normally returned to the resting position in the absence of any actuation by the user.
- the tightening means are normally returned to the resting position by an additional return means, such as an additional elastic return means, for example a spring-loaded means or device or the like.
- the internal passage of the body of the connecting device has a first rectangular first cross section and preferably forms a slot.
- the first strap element and the second strap element each have a rectangular cross section (i.e. shape).
- the first strap element is dimensioned in such a way as to be able to be inserted translationally into the internal passage of the body of the connecting device.
- the first strap element has a rectangular second cross section (i.e. shape) that complements the rectangular first cross section of the internal passage of the body of the connecting device so as to be able to be inserted translationally into said internal passage of the body of the connecting device, which is to say that the second cross section is smaller than the first cross section.
- the strap elements comprise or consist of lengths of strap.
- the baseplate, i.e. a chassis or the like, comprises at least one gas-cylinder storage location in which to accommodate a gas cylinder, preferably several gas cylinder storage locations.
- according to one embodiment, the baseplate comprises three locations which are configured to accept two cylinders of NO/N2 gas mixture and one oxygen cylinder.
- it comprises at least 3 or 4 castors used for moving the trolley over the ground, typically 4 castors, which are preferably orientable and/or braked.
- it comprises at least one manual grip handle allowing a user to manipulate the trolley, in particular to steer it, pull it or push it, during movements over the ground.
- the manual grip handle is attached, directly or indirectly, to the support structure. It is dimensioned to be grasped by the hand of a user in order to manoeuvre the trolley.
- the support structure comprises at least a rear post, also known as main post.
- the support structure comprises (at least) a rear post and a front post, also referred to as main and secondary posts, the posts preferably being arranged parallel to one another.
- the front and rear posts project upwards from the baseplate.
- the front and rear posts are arranged spaced apart, preferably spaced apart by several centimetres to several tens of centimetres.

the front and rear posts are, for example, circular, rectangular or square profile sections or profile sections of some other shape.

the front post has a cross section of the order of 3 to 8 cm, typically from 3 to 6 cm, for example a square section measuring 4×4 cm.

the rear post has a cross section of the order of 3 to 25 cm, for example a rectangular section measuring 4×16 cm.

the front and rear posts are longilinear profile sections, preferably profile sections made from aluminium alloy. However, some other material may potentially be suitable.

the support structure is surmounted by a tray structure, preferably comprising a tray to hold instruments, medical equipment or the like.

the front and rear posts are joined together, preferably at their upper ends, notably via an anchoring structure.

the anchoring structure bears or comprises the tray, for example a plate or the like forming a tray.

it comprises a storage cabinet secured, either directly or indirectly, to the support structure, particularly to the main post.

the cabinet is flat and/or is made of polymer.

the cabinet has the general shape of (approximately) a rectangular parallelepiped.

the cabinet comprises one or more internal storage compartments, with or without access doors or the like.

the cabinet has a height (H) comprised approximately between 60 and 110 cm, a width (L) comprised between 15 and 60 cm, and a thickness (E) comprised between 5 and 18 cm.

at least one gas cylinder is accommodated in at least one location of the baseplate, preferably a gas cylinder containing an NO/N2 mixture.

it comprises two cylinders of NO/N2 mixture accommodated in two locations in the baseplate.

the secondary post is arranged, i.e. situated, between the two cylinders of NO/N2 mixture.

the gas cylinder(s) contain(s) a gaseous NO/N2 mixture containing from 100 to 10000 ppmv of NO and nitrogen for the remainder, preferably from 100 to 2000 ppmv of NO.

the gas cylinder(s), i.e. each cylinder of NO/N2 mixture, contain(s) a gaseous NO/N2 mixture containing from 100 to 1000 ppmv of NO and nitrogen for the remainder, preferably from 200 to 1000 ppmv of NO.

the gas cylinder(s) contain(s) gas at a pressure comprised between 5 bar and at least 200 bar absolute.

each cylinder of NO/N2 mixture is secured, directly or indirectly, to one of the front or rear posts.

it further comprises an oxygen (O2) cylinder in an additional location of the baseplate.

the oxygen (O2) cylinder is secured, directly or indirectly, to the front post.

the support structure is surmounted by a pole intended to support gas delivery apparatus.

the pole is attached to the support structure, particularly to the anchoring structure that joins the main post to the secondary post.

a gas delivery apparatus is secured to the pole, preferably via a mounting plate of the VESA type or the like, particularly an apparatus for delivering an NO/N2 mixture.

the gas cylinder(s) is (are) equipped with a gas distribution valve, particularly an integrated regulator valve.

the gas cylinder(s) is (are) equipped with a protective cap protecting the gas distribution valve.

the gas cylinder(s) is (are) ogive-shaped, i.e. in the form of a cylindrical body surmounted by a narrowing portion forming a neck with a gas inlet/outlet orifice communicating with the internal storage volume of the gas cylinder.

the trolley is designed to be rolled along the ground when manipulated and moved, typically pushed or pulled, by a user, particularly a caregiver, for example a doctor, a nurse or the like, within a hospital building or the like.

the baseplate of the trolley is situated at the bottom part of the trolley, namely at its base which is situated in close proximity to the ground.

the baseplate of the trolley comprises a platform in which are formed the storage locations which are dimensioned to each accommodate one gas cylinder in an upright position.

the trolley comprises three storage locations arranged in a triangle.

the gas distribution valve s of the gas cylinders are connected fluidically to the NO/N2 mixture delivery apparatus via flexible hoses, so as to supply the apparatus with NO/N2 mixture and preferably with oxygen.

The invention also relates to the use of a trolley according to the invention for transporting one or more cylinder(s) of pressurized gas, such as an NO/N2 mixture and/or oxygen, and preferably a gas delivery apparatus, typically an apparatus delivering NO (i.e. an NO/N2 mixture) intended to be administered to an adult patient, a child or newborn suffering from PPHN, ARDS or pulmonary hypertension, or from some other pulmonary affliction, via a breathing circuit supplied with respiratory gas containing at least 20 vol % of oxygen, such as air or an N2/O2 mixture, coming from a medical ventilator.

Moreover, the invention also relates to a method for treating an adult patient, a child or a newborn suffering from PPHN, ARDS or pulmonary hypertension, or from some other pulmonary affliction, and who has need of a final gaseous mixture containing oxygen, nitrogen and NO, which mixture is obtained by mixing, within a breathing circuit, on the one hand, respiratory gas containing at least 20 vol % of oxygen, such as air or an N2/O2 mixture, coming from a medical ventilator with, on the other hand, an NO/N2 gaseous mixture which is delivered by an NO delivery apparatus supplied with NO/N2 gaseous mixture coming from one or more pressurized-gas cylinder(s) arranged on a trolley according to the invention, preferably a trolley according to the invention which also carries the NO delivery apparatus.

In the context of the invention, the term "means" may be replaced by the terms "device", "mechanism" or "system" or any similar term. For example, the term "immobilizing means" may be replaced by "immobilizing device", "immobilizing mechanism" or "immobilizing system"; likewise, the term "release means" may be replaced by "release device", "release mechanism" or "release system"; and the term "tightening means" may be replaced by "tightening device", "tightening mechanism" or "tightening system".

BRIEF DESCRIPTION OF THE VIEWS OF THE DRAWINGS

The invention will now be better understood from the following detailed description, given by way of illustration but without limitation, with reference to the appended figures, in which.

DETAILED DESCRIPTION

Figure 1:
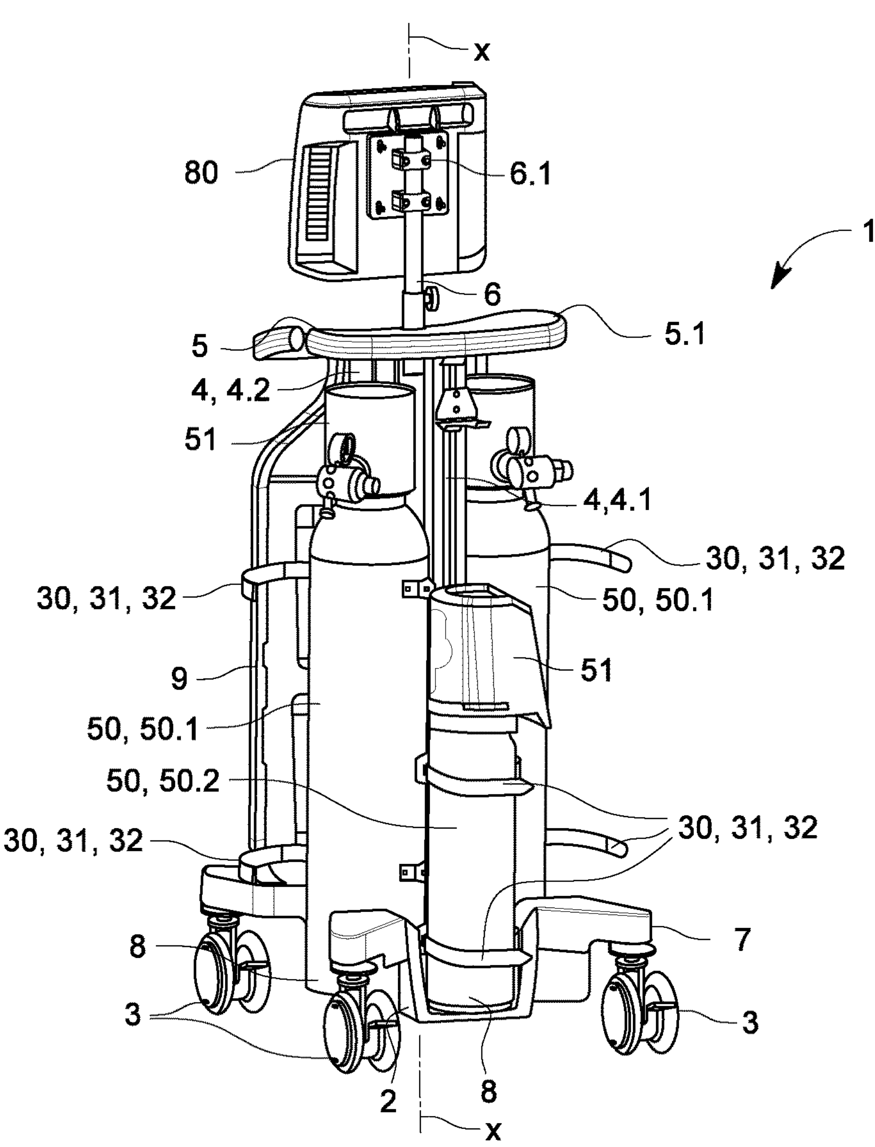
FIG. 1 is a schematic view of one embodiment of a mobile trolley according to the invention, in a ¾ rear view.

FIG. 1 schematically depicts one embodiment of a mobile trolley 1 according to the invention which is intended for the hospital sector or similar and which is designed to be easily moved, i.e. rolled, along the ground when it is manouvred, typically pushed or pulled, by a caregiver, for example a doctor, a nurse or the like, within a hospital building or the like.

In FIG. 1, the trolley 1 is equipped with its equipment, particularly 3 gas cylinders 50, 50.1, 50.2 and a gas delivery apparatus 80, in this instance for delivering NO. The trolley 1 has a front side and a rear side. The rear side is the side that faces the user when the latter is pushing the trolley 1 in order to move it by rolling over the ground, namely is the side on which the cabinet 9 is located, while the front side of the trolley 1 is the side on which the gas cylinders 50 are situated.

The mobile trolley 1 of the invention comprises, in the lower part, a baseplate 2 or chassis comprising several castors 3, in this case two pairs of castors, for moving the trolley 1 by rolling it along the ground. The castors 3 are small wheels which are arranged, such as to be able to pivot, on extensions 7 of the baseplate 2 that form legs or the like. The extensions 7 are formed in one piece with the rest of the baseplate 2, for example by injection moulding or another technique, and are for example made of polymer.

Preferably, the castors 3 comprise an immobilizing device, such as a brake or the like, for immobilizing them in order to prevent them from rotating, thus enabling the trolley 1 to be kept motionless on the ground and therefore avoid any accidental or inadvertent movement thereof. The activation or, conversely, the deactivation of the device for immobilizing the castors is effected by means of a control pedal (not visible because it is on the rear side) that can be actuated or similar by the user, especially when the user presses on it with their foot.

More specifically, the baseplate 2 comprises several storage locations 8 on the front side of the trolley 1 for accommodating the gas cylinders 50, namely in this instance two cylinders 50.1 containing an NO/N2 mixture, for example an NO/N2 mixture containing from 100 to 1000 ppm of NO and nitrogen for the rest, and a cylinder 50.2 containing gaseous oxygen.

The gas cylinders 50 have a cylindrical body and generally an ogive shape. They are made, for example, of aluminium alloy, of composite materials or of steel. Each cylinder 50 is equipped with a gas distribution valve (not visible), for example a valve with an integrated pressure regulator, or IPR valve, or a conventional valve, arranged at its neck and comprising the orifice communicating fluidically with the internal volume of the cylinder, and preferably a protective cap 51 for protecting the gas distribution valve against knocks in particular. The gas distribution valves of the gas cylinders are usually connected fluidically to the gas delivery apparatus 80 via flexible hoses, so as to supply the apparatus with NO/N2 mixture and with oxygen.

The storage locations 8 in the baseplate 2 each comprise a small platform, for example in the form of a disc, on which each gas cylinder 50 rests in an upright position.

The trolley 1 further comprises a support structure 4 projecting upwards from the baseplate 2, namely (approximately) vertically along the vertical axis (AA) of the trolley 1. In this instance, the support structure 4 comprises a rear post 4.2 and a front post 4.1, these posts being arranged parallel to one another and offset from one another, i.e. slightly spaced apart, for example by a few centimetres to a few tens of centimetres depending on the size of the trolley 1. Using two parallel posts 4.1, 4.2 makes it possible to improve the solidity and robustness of the assembly.

A storage cabinet 9 is arranged along the support structure 4, particularly along the rear post 4.2. The storage cabinet 9 extends substantially between the baseplate 2 and the tray structure 5, which is to say that it projects upwards from the baseplate 2 along the vertical axis (AA) of the trolley 1. The cabinet 9 advantageously has a flattened shape so as to limit the bulkiness of the assembly and may be made from polymer or from composite. It comprises one or more internal compartment(s) used for storing medical equipment, such as caregiving accessories, various utensils, such as gas administration kits, breathing masks or tracheal tubes, hoses, connectors, etc., documents, such as instructions on the use of the apparatus 80, or the like. The outward-facing face (not visible) of the cabinet 9 may comprise one or more door(s), for example pivoting or tilting door(s), providing access to the internal storage compartments.

A tray structure 5 is arranged at the upper end of the support structure 4 which bears a handgrip 5.1 to be grasped in the hand by a user in order to manoeuvre and steer the trolley 1 as it is moved along the ground. The tray structure 5 may form a tray, a dish or the like used to accommodate small items of equipment, utensils, documents or the like that may be used in the treatment of the patient.

Moreover, a pole 6 supported by the tray structure 5 or by the support structure 4 projects upwards, which is to say along the vertical axis (AA), and bears the gas delivery apparatus 80, particularly in this case an apparatus for delivering an NO/N2 mixture. The apparatus may be secured here via a support mounting plate 6.1, for example of VESA (Video Standards Electronics Association) type.

In order to improve the solidity of the trolley 1, the main post or rear post 4.2 and the secondary post or front post 4.1 may be joined together, typically at their upper ends, by means of an anchoring structure (not visible), for example a plate or the like. The anchoring structure may bear, comprise or constitute the tray structure 5.

In the conventional way, the gas delivery apparatus 80 is intended to be fluidically connected, while the patient is being treated, to the patient circuit that fluidically connects a medical ventilator to a respiratory interface, such as a breathing mask or a tracheal tube, that delivers the gas, for example a gaseous mixture based on NO, on oxygen and on nitrogen, to the airways of the patient who is to be treated. The gas delivery apparatus 80 is supplied with gas, particularly with NO/N2, by the cylinder(s) 50, 50.1, 50.2 and with O2 by the O2 cylinder 50.2 via flexible gas-conveying hoses which are coupled to the outlet connectors of the gas distribution valves with which these cylinders 50, 50.1, 15 2 are equipped.

As is visible in FIG. 1, the gas cylinders 50 need to be held in place on the trolley 1 by means of attachment or securing devices 30 which are secured to the support structure 4 and in particular to the posts 4.1, 4.2. In general, several securing devices 30, typically 2 securing devices 30, are provided per cylinder 50, these holding the top and bottom zones or regions of the body of each cylinder 50 in position. The vertical positioning of these devices on the posts 4.1, 4.2 may be fixed or else axially adjustable (XX) so that cylinders 50 of different sizes can be secured firmly and efficiently.

By attaching or securing the gas cylinders 50, it is possible to prevent them from falling, notably during movements of the trolley 1, thereby improving the safety in the use of the trolley 1.

Figure 2:
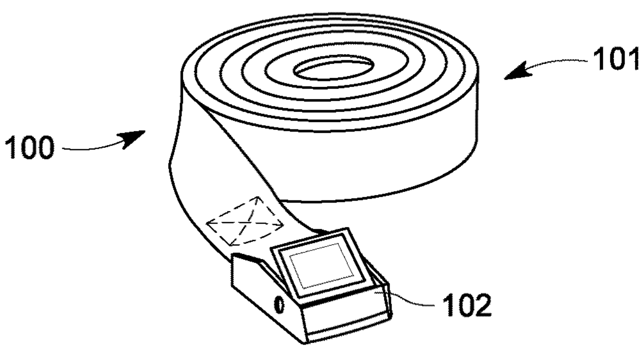
FIG. 2 depicts a flexible fabric strap according to the prior art.

Conventionally, by way of securing devices 30, use is made of flexible, which is to say nonrigid, straps 100 formed of a strip 101 of flexible fabric equipped with a connector 102, as illustrated in FIG. 2. However, the use of such straps 100 is impractical, notably because of their flexibility which means that they have a tendency to become accommodated behind the cylinders 50, complicating the task of the user wishing to attach them, and therefore causing this user to lose time, with the risk that a cylinder may topple before it has been attached. In addition, such straps are difficult to clean and to disinfect because of the fabric of which they are made. In addition, they are subject to more rapid wearing if they are not used with care and if they are not properly maintained over the course of time.

In order to alleviate these problems, according to the invention, the mobile trolley 1 is equipped with several attachment or securing devices 30 which are not flexible straps made of fabric as illustrated in FIG. 2, but are strap elements or portions made of semirigid polymer, as illustrated in FIG. 3 to FIG. 10.

As a preference, the first and second strap elements 31, 32 are made of a semirigid polymer, for example of polyurethane or polyamide, notably of Nylon®. Using such material allows the strap elements 31, 32 to be given sufficient elasticity to allow them to conform to the external contour of the bodies of the gas cylinders when tightened around the cylinders while, on the other hand, also giving them a certain degree of mechanical integrity that prevents them from collapsing or the like when detached, for example in the absence of a cylinder or before the cylinders are secured, so as to facilitate the securing, which is to say the joining-together of said straps.

The securing devices 30 or attachment devices are arranged on the support structure 4 and allow the gas cylinders 50, 51 to be secured or attached firmly to the support structure 4, particularly to the rear post 4.2 and front post 4.1. As a preference, each gas cylinder 50, 51 is held in place, which is to say secured or attached, by a pair of securing devices 30 which are arranged spaced apart from one another, for example spaced apart by a few tens of centimetres, so as to hold each cylinder 50, 51 in place in different zones, typically at the top and at the bottom of the cylindrical body of each cylinder 50, 51 when it is in an upright position.

Each securing device 30 comprises a first strap element 31 comprising a free first end 31.1, and a second strap element 32 comprising a connecting device 20. The first strap element 31 and second strap element 32 collaborate with one another via the free first end 31.1 and the connecting device 20. More specifically, the free first end 31.1 of the first strap element 31 and the connecting device 20 of the second strap element 32 collaborate with one another to secure them mechanically to one another.

Figure 6:
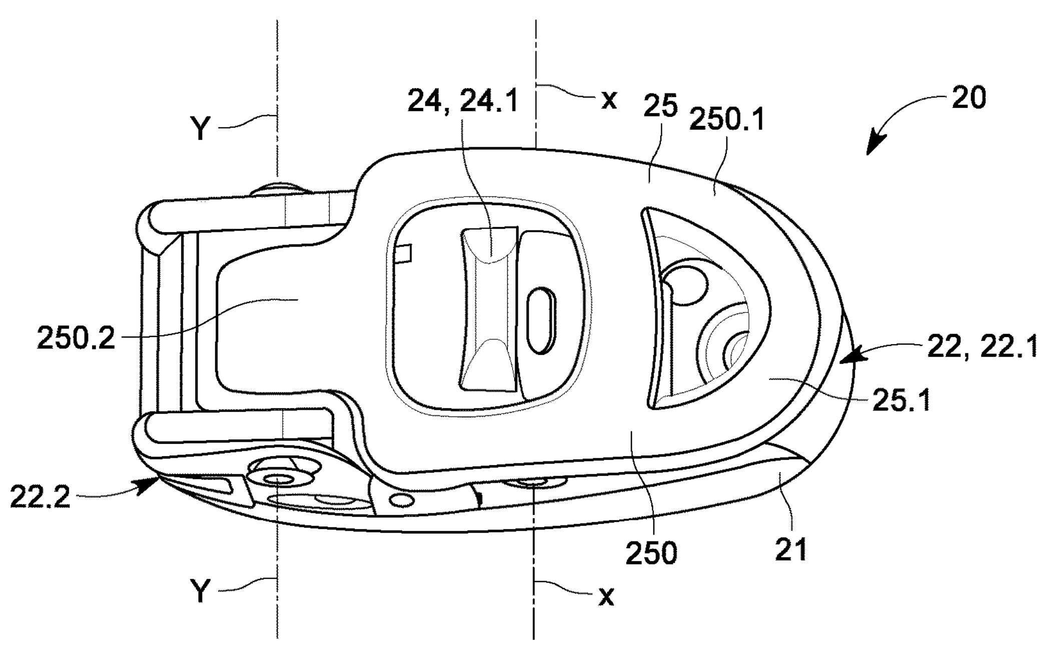

The connecting device 20, one embodiment of which is depicted in FIG. 6, comprises a main body 21 through which there passes an internal passage 22 which extends between a passage entrance 22.1 and a passage exit 22.2. The internal passage 22 is configured to accommodate at least part of the first strap element 31 which is configured and/or dimensioned to be inserted, by the user, in a translational movement, into the internal passage 22 of the body 21 of the connecting device 20.

The connecting device 20 may be secured to the second strap element 32 by screw-fastening, riveting, adhesive bonding or the like.

The connecting device 20 further comprises immobilizing means 23 which are able to move between (at least) two positions referred to as "stable", namely an immobilizing or locking position and a releasing or unlocking position, or even intermediate positions also.

Figure 3:
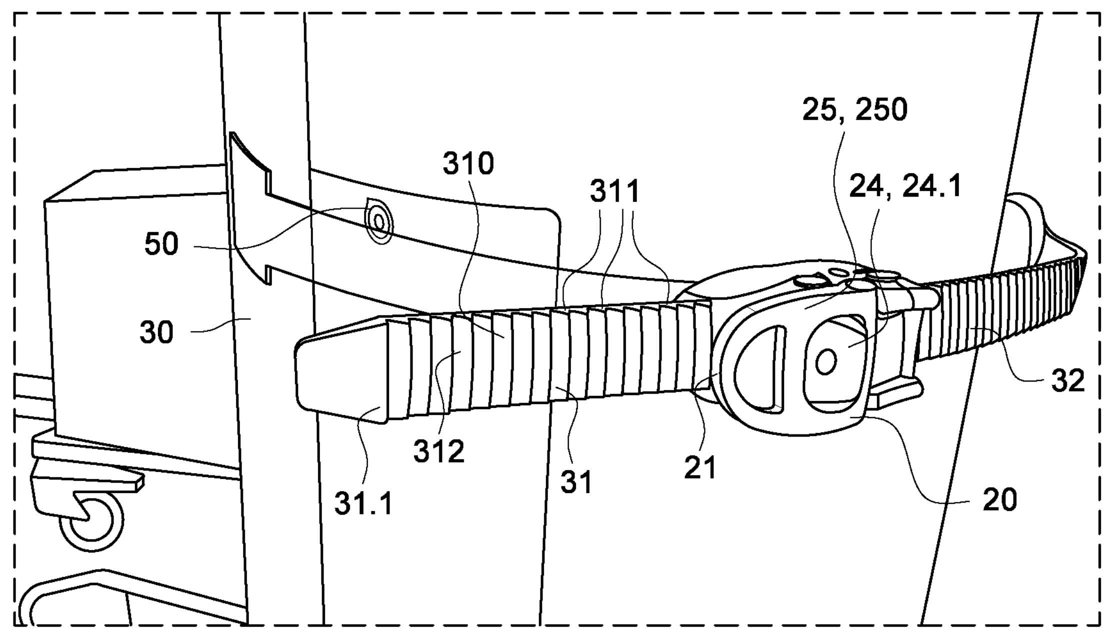
FIG. 3 to FIG. 10 depict one embodiment of a connecting device with rigid strap elements according to the invention, used for attaching gas cylinders to the trolley of FIG. 1.

In the immobilizing or locking position, the immobilizing means 23 of the connecting device 20 collaborate with the first strap element 31 inserted into the internal passage 21 to prevent or oppose any movement of withdrawal, i.e. total or partial withdrawal, of the first strap element 31 from the internal passage 21, which is to say to prevent any translational withdrawal, by the user, of the first strap element 31 out of the internal passage 21. This allows the cylinders 50, 51 to be secured, which is to say attached, and/or held in place, firmly on the trolley 1, as illustrated in FIG. 3 which shows the first and second strap elements 31, 32 assembled with one another to firmly hold/secure the gas cylinder 50.

Figure 4:
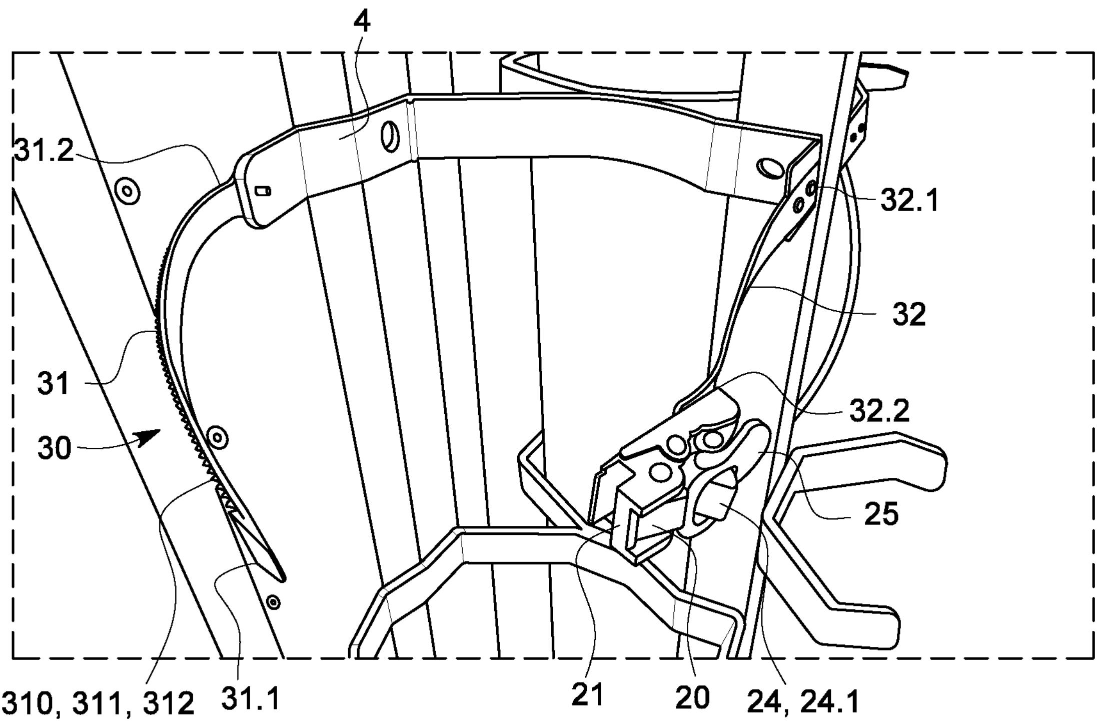
Figure 5:
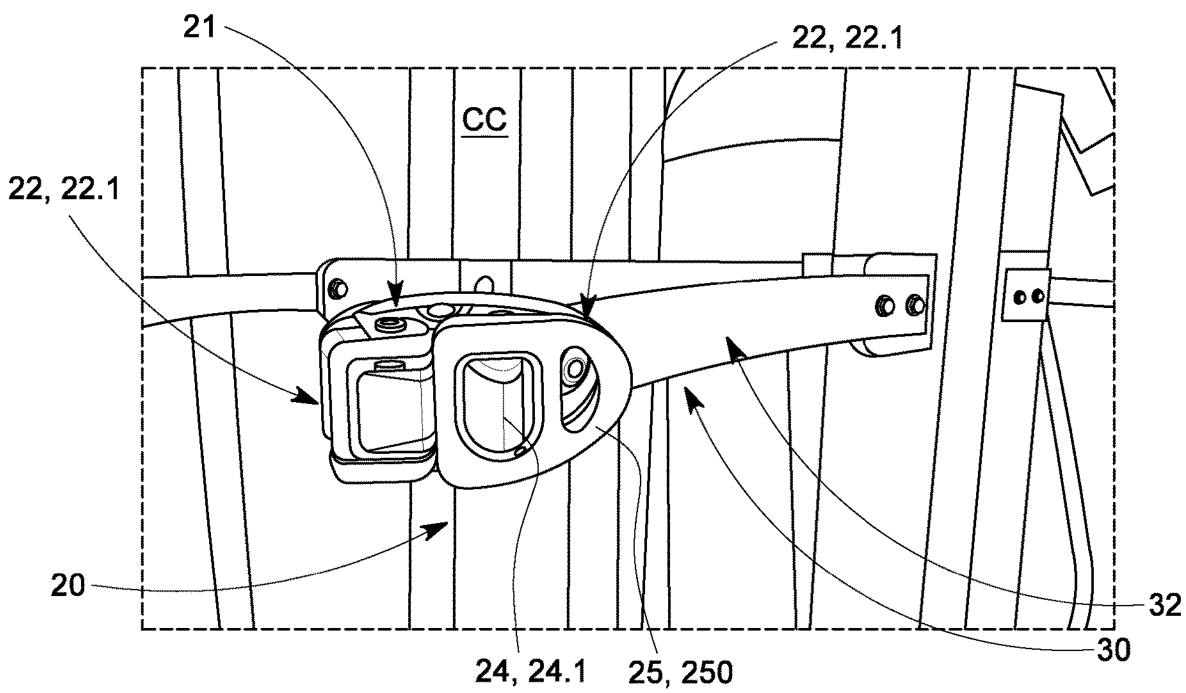

Conversely, in the releasing or unlocking position, the immobilizing means 23 of the connecting device 20 allow the first strap element 31 to move, i.e. to shift, in the internal passage 21, which is to say that the immobilizing means 23 do not oppose or no longer oppose a translational withdrawal (or even continued insertion), by the user, of the first strap element 31 from or into the internal passage 21. This notably allows the first and second strap elements 31, 32 to be disassembled or uncoupled from one another, as illustrated in FIG. 4 or FIG. 5, thus allowing the cylinders 50, 51 to be released when they are to be removed from the trolley 1, for example in order to replace an empty cylinder with a cylinder full of gas.

Moreover, release means 24, which can be actuated by the user, are also provided on the connecting device 20. These allow the transition from the immobilizing position to the releasing position, when actuated by the user, for example when the user presses them, as illustrated in FIG. 6.

The release means 24 comprise for example a push-button or the like which presses against the immobilizing means 23 in order to cause them to pass into the releasing position when the user exerts an action, for example applies finger pressure, on (to) said release means 24.

The release means 24 are normally in a resting position when the immobilizing means 23 are in the immobilizing position.

After they have been released, for example upon the ending of the finger pressure exerted by the user, the release means 24 may be returned to their resting position by elastic return means such as one (or more) spring(s) or the like.

Figure 10:
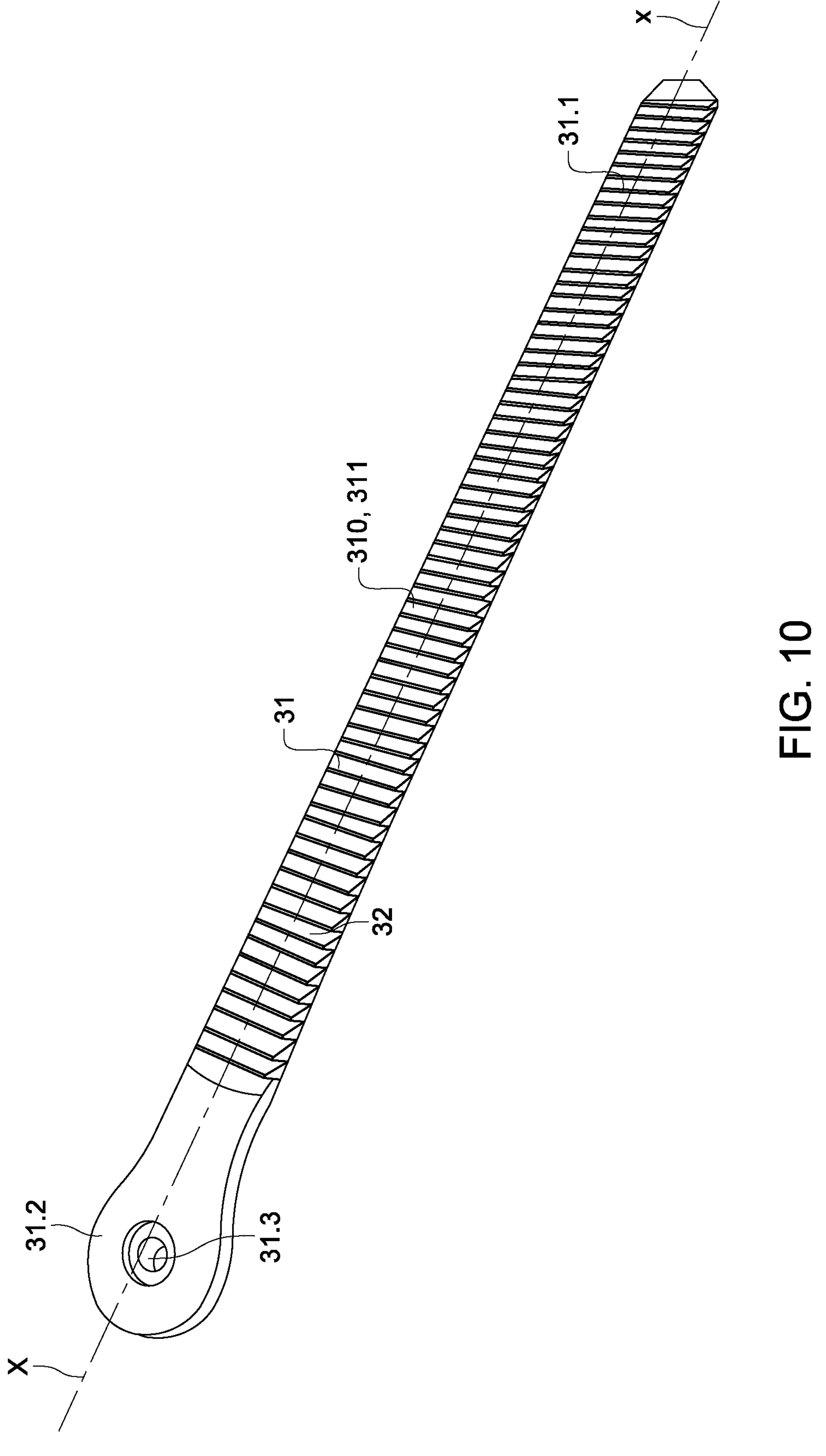

Furthermore, the first strap element 31 and second strap element 32 typically have the form of a strip or band, as illustrated notably in FIG. 10 which shows one embodiment of the first strap element 31. They therefore comprise two opposite faces or services 312, 313, as visible in FIG. 7 and FIG. 8, namely an outwardly-facing exterior face and an interior face that faces towards the gas cylinder.

More specifically, in order to improve the firm and secure retention of the first strap element 31 in the housing formed by the internal passage 21, and notably to prevent unwanted slipping thereof in the direction of withdrawal from the internal passage 21 when a cylinder applies a thrusting force on it, there is provided, according to the invention, (at least)

a relief textured region 310 on one 312 of the faces of the first strap element 31, as schematically indicated in FIG. 7 to FIG. 10.

The immobilizing means 23 collaborate, in the immobilizing position, with this relief textured region 310 of the (each) first strap element 31 so as notably to prevent the first strap element 31 from being able to slip and/or be inadvertently extracted from the internal passage 21 into which it has been inserted and in which it is held by the immobilizing means 23, when these are in the immobilizing position.

Figure 8:
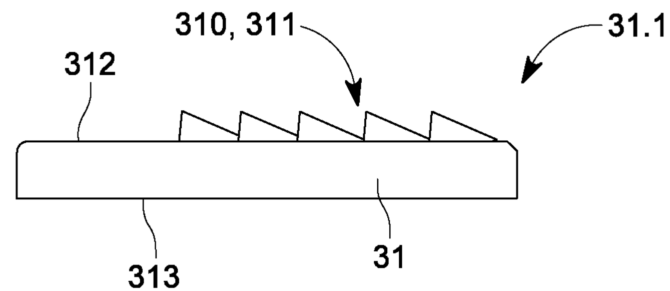
Figure 9:
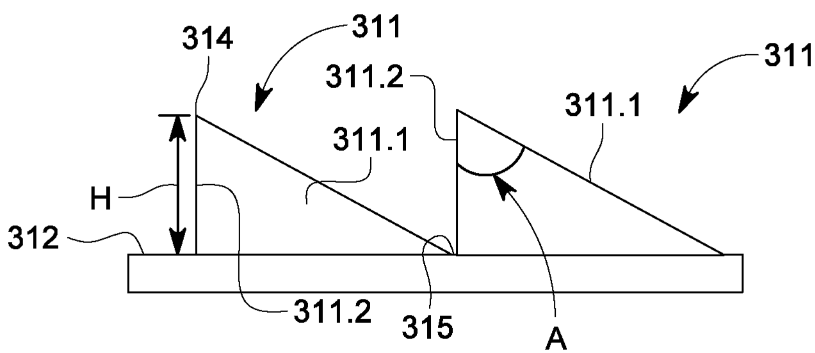

As schematically indicated (cross-sectional side views) in FIGS. 8 & 9, the relief textured region 310 comprises a succession of ribs 311, preferably straight ribs, which are arranged parallel to one another.

These ribs 311 form an alternating sequence of peaks or crests 314 and of valleys or troughs 315, as visible in FIGS. 8 & 9 which schematically indicate a partial and enlarged view of the ribs 311. Each rib 311 exhibits (when viewed in cross section) a front side 311.1 forming an inclined ramp angled towards the free first end 31.1 of each first strap element 31, and a (substantially) vertical rear side 311.2 situated at the opposite end from the front side 311.1.

As a preference, the angle A formed at the crest 314 separating the front side 311.1 from the rear side 311.2 is comprised between 30 and 60°, preferably of the order of 40 to 50°.

The front side 311.1 and rear side 311.2 of the one same rib 311 meet at the crest 314 of the rib 311 concerned, while one rib 311 is separated from the next rib 311 by a valley 315. As a preference, the height H of a rib 311 is less than or equal to 5 mm, typically between 1 and 3 mm.

As schematically indicated in FIG. 10, the ribs 311 are arranged parallel to one another, perpendicular to the axis (XX) of the first strap element 31. The external face 312 of the first strap element 31 typically comprises several tens of ribs 311. Conversely, the internal face 313 of the first strap element 31 is preferably smooth, which is to say free of ribs 311.

Each first strap element 31, including the relief textured region 310, is preferably formed as a single piece by injection moulding or the like, in a polymer material.

As may be seen, the relief textured region 310 is situated at least towards the free first end 31.1 of each first strap element 31 and extends over a majority of the external face 312 of the first strap element 31, namely over at least 40 to 50% of the external surface. Thus, in FIG. 10, it may be seen that the relief textured region 310 extends, in the embodiment depicted, over at least 75% in this instance, and even over at least 80%, of the surface area of the external face 312 of the first strap element 31.

The first strap element 31 in FIG. 10 has the form of an elongate strip comprising a rear end 31.2, in this instance widened to form an attachment head, through which there passes a fixing orifice 31.3 used for securing the first strap element 31 to the support structure 4, for example by screw-fastening, using a screw or the like that is inserted through said fixing orifice 31.3, particularly to one or the other of the rear or front posts 4.1, 4.2 of the support structure 4.

The second strap element 32 has a similar structure, namely the form of an elongate strip comprising an upstream end 32.1 similar or identical to the rear end 31.2 of the first strap element 31 so that it too can be secured to the support structure 4 for example by screw-fastening using a screw or similar.

Figure 7:
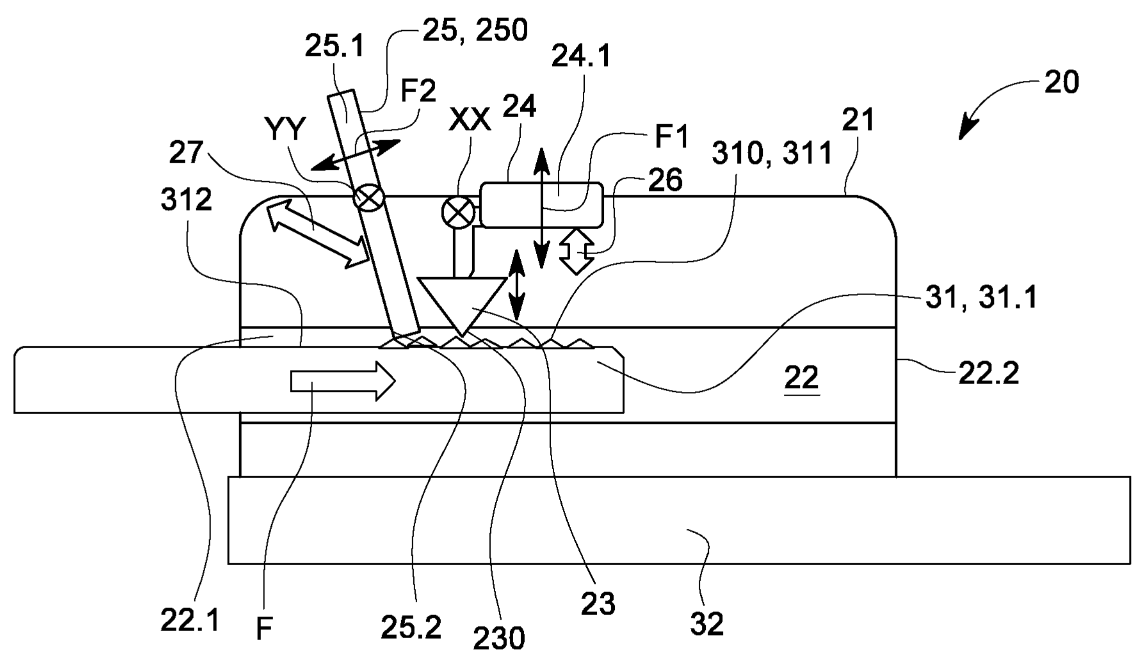

FIG. 7 schematically depicts the structure and operation of the connecting device 20 of the second strap element 32 when it is collaborating with the first strap element 31 in order to ensure securing, which is to say attachment, of a gas cylinder 50 to the trolley 1.

As has already been explained, it is possible to discern the main body 21 through which there passes the internal passage 22 that extends between a passage entrance 22.1 and a passage exit 22.2, which passage acts as a housing into which the first strap element 31 can be inserted by the user, in a translational movement from left to right in FIG. 7, which is to say in the direction of the arrow F which indicates the direction of insertion, via the passage entrance 22.1.

Once the first strap element 31 has been inserted into the internal passage 22, the mobile immobilizing means 23 are in their immobilizing position as illustrated in FIG. 7 and come to collaborate with the first strap element 31, particularly the textured region 310 borne by the external face 312 of the first strap element 31, so as to prevent or oppose any movement of withdrawal of said first strap element 31 inside the internal passage 21, namely any withdrawal of the first strap element 31 in the direction of withdrawal which is the opposite of the direction of insertion (arrow F).

In this immobilizing position, the immobilizing means 23 press against the textured region 310 borne by the external face 312 of the first strap element 31, via a proximal part that forms an immobilizing-cam element 230.

In other words, the immobilizing means 23 comprise an immobilizing-cam element 230 that becomes inserted in one of the valleys 315 situated between two successive ribs 311 so as to prevent the withdrawal of the first strap element 31 from the internal passage 22, given that the immobilizing-cam element 230 then comes into abutment against the vertical rear-side wall 311.2 adjacent to the valley 315 in which the immobilizing-cam element 230 is accommodated. This abutment prevents translational withdrawal (direction opposite to the arrow F) but may allow continued insertion movement since, in that case, the immobilizing-cam element 230 is able to slide along the ramp or slope of the other rib 310, which is to say in the direction of insertion given by the arrow F, until it enters the next valley 315, or indeed passes via one or more other valleys 315, so as to increase the tightness of the clamping, as explained hereinafter.

Specifically, the further the first strap element 31 is inserted translationally into the internal passage 22 of the connecting device 20 of the second strap element 32 (as illustrated in FIG. 3), the more it is possible to increase the tightness of the clamping achieved by the securing device 30, which is to say attachment device, on the body of the gas cylinder 50 that is held in place by the securing device 30 concerned.

When the gas cylinder 50 is empty and needs to be replaced, it is necessary to slacken off the securing device 30 and open it by separating the two strap elements 31, 32 from one another, which is to say by extracting the first strap element 31 from the internal passage 22 of the connecting device 20 of the second strap element 32, as illustrated in FIGS. 4 & 5. In order to do this, the immobilizing means 23 need to move into their releasing position in which a movement of the first strap element 31 in the internal passage 21 is permitted, particularly a translational withdrawal of the first strap element 31 from the internal passage 21 of the connecting device 20 of the second strap element 32.

The transition from the immobilizing position to the releasing position is achieved by the user pressing on the release means 24, which can be actuated by the user, such as a push-button 24.1 or the like. These release means 24 therefore move from a resting position to an actuated position. When actuated, the release means 24 move into an actuated position and therefore collaborate with the immobilizing means 23, for example pressing on these, in order to cause them to pass from the immobilizing position to the releasing position, for example by pivoting or tilting about an axis XX or via some other movement.

In the releasing position (not shown), the immobilizing means 23 cease their collaboration with the textured region 310 borne by the external face 312 of the first strap element 31. More specifically, the immobilizing-cam element 230 is then withdrawn from the valley 315 between two successive ribs 311 in which it had been situated, thereby allowing the first strap element 31 to be withdrawn from the internal passage 22 since the immobilizing-cam element 230 has ceased being in abutment against the vertical rear-side wall 311.2 adjacent to the valley 315 in which it was accommodated. A movement of extraction is then possible given that the immobilizing-cam element 230 is now positioned "above" the ribs 310, which is to say is at some distance from the textured region 310 and is no longer pressing against same.

When the user ceases to press on the release means 24, such as the push-button 24.1, these means are able to return to their resting position, which is to say their non-actuated position, being returned by return means, for example one (or more) elastic element(s) 26, such as one (or more) return spring(s) or the like. The travel of the release means 24 between their resting position and their actuated position is indicated schematically in FIG. 7 by the double-ended arrow F1.

Of course, any other immobilizing/release mechanism may be used.

Advantageously, the connecting device 20 of the second strap element 32 also comprises tightening means 250 which in this instance comprise a lever element 25 that can be actuated by the user, enabling adjustment of the tension with which the two strap elements 31, 32 are closed together when these elements are assembled (as illustrated in FIG. 3) and attached to one another, as explained hereinabove and illustrated in FIG. 7.

According to one embodiment, the lever element 25 of the tightening means 250 is able to pivot (double-ended arrow F2) about an axis YY. It comprises a proximal portion 25.1 that can be actuated by the user to cause it to pivot, and a distal portion 25.2 able to collaborate, itself also, with the textured region 310 of the first strap element 31 when the latter is accommodated inside the internal passage 22 of the connecting device 20 of the second strap element 32.

This distal portion 25.2 comes to press, which is to say into abutment, on the vertical rear-side wall 311.2 of one of the ribs 310 on which it exerts a thrusting force in the direction of the arrow F, namely in the direction of insertion of the first strap element 31, when the lever element 25 is actuated by the user, thereby causing the first strap element 31 to progress within the internal passage 21 of the connecting device 20, thus increasing the tightness of the securing assembly, namely how tightly the strap is clamped around the body of the cylinder concerned.

Although the immobilizing means 23 are in the immobilizing position, while the tightening means 250, namely the pivoting lever element 25, are being actuated by the user, which is to say during tightening, the translational movement of the first strap element 31 is able to occur, which is to say is not prevented because, as has already been explained, the immobilizing-cam element 230 is able to slide along the ramps 311.1 borne by the ribs 310 which are juxtaposed with one another, thereby allowing the first strap element 31 to progress in the direction of insertion (arrow F) given that the immobilizing-cam element 230 is able to progress by passing successively from one valley 315 to the next.

When the pivoting lever element 25 of the tightening means 250 is released by the user, it ceases to collaborate with the textured region 310 of the first strap element 31 and returns to its resting position as shown in FIG. 6. Once again, it may be returned to its resting position via return means, for example one (or more) additional elastic element(s) 27, such as one (or more) return spring(s) or the like.

In other words, the tightening means 250 of the securing device 30, when actuated by the user, come to collaborate with the relief textured region 310 of the first strap element 31 when the first strap element 31 is inserted in the internal passage 21 of the connecting device 20 and when also the immobilizing means 23 are in the immobilizing position, so as to cause the first strap element 31 to progress translationally within the internal passage 21 of the connecting device 20, in the direction of insertion (arrow F) and thus increase or improve the tightness with which the gas cylinder 50 held in place by the securing device 30 is clamped.

It may be seen in FIG. 6 that the proximal portion 25.1, which can be actuated by the user, of the lever element 25 has, in the embodiment depicted, the shape of a loop 250.1 connected to the distal portion 25.2 (not visible) by a junction portion 250.2 such as a portion in the form of a strip or the like.

In general, the trolley 1 is particularly well suited to use in a hospital environment, notably in the context of therapeutic treatment of an adult, adolescent, child or newborn patient suffering from a pulmonary affliction such as PPHN, ARDS or pulmonary hypertension in cardiac surgery through the administration by inhalation of gaseous NO to the patient having need of same in such a way as to dilate their pulmonary blood vessels and thus increase the oxygenation of their blood by improving pulmonary gaseous exchanges.

What is claimed is:

1. A mobile trolley (1) comprising:

a baseplate (2) configured to accommodate at least one gas cylinder (50), several castors (3) for moving the trolley along the ground, a support structure (4) projecting upwards from the baseplate (2), and at least one securing device (30) arranged on the support structure (4) for securing said at least one gas cylinder (50) to said support structure (4), wherein said at least one securing device (30) comprises a first strap element (31) comprising a free first end (31.1), and a second strap element (32) comprising a connecting device (20), said first strap element (31) connecting with the second strap element (32) to allow the first strap element and the second strap element to be secured to one another when the free first end (31.1) of the first strap element (31) is connected with the connecting device (20) of the second strap element (32), wherein the first strap element (31) and second strap element (32) are made of semirigid polymer, and the connecting device (20) of the second strap element (32) comprises:

a main body (21) through which passes an internal passage (22) extending between an entrance (22.1) and an exit (22.2) and which is configured to accommodate at least part of the first strap element (31), immobilizing means (23) capable of moving between at least two positions, comprising:

an immobilizing position in which the immobilizing means (23) connects with a relief textured region (310) of the first strap element (31) inserted into the internal passage (21), so as to prevent and oppose any withdrawal movement of said first strap element (31) from the internal passage (21), and a releasing position in which the immobilizing means (23) allow withdrawal movement of the first strap element (31) from the internal passage (21), release means (24), capable of being actuated by a user, connecting with the immobilizing means (23) in order to cause the immobilizing means to pass from the immobilizing position to the releasing position, when actuated by the user, and tightening means (250), capable of being actuated by the user, configured to connect with the relief textured region (310) of the first strap element (31), when the first strap element (31) is inserted into the internal passage (21) of the connecting device (20) of the second strap element (32) and wherein when also the immobilizing means (23) are in the immobilizing position, when they are actuated by the user, the tightening means (250) cause the first strap element (31) to progress translationally within the internal passage (21) of the connecting device (20), in the direction of insertion.

2. The trolley according to claim 1, wherein the first strap element (31) is configured to be inserted, via the free first end (31.1), into the internal passage (22) of the connecting device (20) of the second strap element (32), via the entrance (22.1) to said internal passage (22) of the connecting device (20), via a translational movement.

3. The trolley according to claim 1, wherein the relief textured region (310) comprises a succession of ribs (311) arranged parallel to one another, preferably straight ribs (311).

4. The trolley according to claim 3, wherein the ribs (311) each have a front side (311.1) forming a ramp, and a rear side (311.2) that is vertical, these sides being separated by a crest (314).

5. The trolley according to claim 1, wherein the relief textured region (310) is borne on an external face (312) of the first strap element (31).

6. The trolley according to claim 1, wherein the tightening means (250) comprise a lever element (25).

7. The trolley according to claim 6, wherein the lever element (25) is able to pivot.

8. The trolley according to claim 6, wherein the lever element (25) comprises a distal portion (25.2) that comes into connection with the textured region (310) of the first strap element (31) when the first strap element (310) is accommodated in the internal passage (21) of the connecting device (20) of the second strap element (32).

9. The trolley according to claim 7, wherein the lever element (25) further comprises a proximal portion (25.1) that can be actuated by the user in order to cause the lever element (25) to pivot.

10. The trolley according to claim 3, wherein the ribs (311) are configured to allow the first strap element (31) to be inserted into the internal passage (21) of the body of the connecting device (20) but prevent the first strap element (31) from being withdrawn from said internal passage (21) when the immobilizing means (23) are in the immobilizing position and connecting with the ribs (311).

11. The trolley according to claim 10, wherein the ribs (311) form raised serrations juxtaposed with one another.

12. The trolley according to claim 8, wherein when the lever element (25) is actuated by the user and pivoted, the distal portion (25.2) of said lever element (25) comes to bear against a vertical rear side (311.2) of at least one of the ribs (310) in order to apply thereto a thrusting force that is sufficient to cause the first strap element (31) to effect a translational movement within the internal passage (21) of the connecting device (20) in the direction (F) of insertion of the first strap element (31).

13. The trolley according to claim 12, wherein when the immobilizing means (23) are in the immobilizing position and the lever element (25) is actuated by the user, the translational movement of the first strap element (31) within the internal passage (21) of the connecting device (20) in the direction of insertion (F) is not prevented.

14. The trolley according to claim 1, wherein in the immobilizing position, the immobilizing means (23) press against the textured region (310) borne by an external face (312) of the first strap element (31), via a proximal part that forms an immobilizing- cam element (230).

15. A method of using a trolley (1) according to claim 1, for transporting one or more gas cylinders containing at least one of an NO/N2 mixture and oxygen.

* * * * *